Patented Nov. 27, 1951

2,576,728

UNITED STATES PATENT OFFICE 2,576,728

CHLORINE OXIDATION OF BILE ACIDS

Richard J. Servis, Averill Park, Richard H. Carroll, Old Chatham, and Benjamin Franklin Tullar, East Greenbush, N. Y., assignors to Sterling Drug Inc., New York, N. Y., a corporation of Delaware No Drawing. Application May 19, 1950,
Serial No. 163,088

3 Claims. (Cl. 260—397.1)

This invention relates to the oxidation of nuclearly hydroxylated bile acids to bile acids containing one or more nuclear carbonyl groups, using chlorine as the oxidizing agent.

We have found that chlorine is particularly valuable for the oxidation of bile acids on a commercial scale, due in part to the inexpensiveness of chlorine as compared with other oxidizing agents such as chromic oxide or bromine, and also to the ease of handling chlorine on a large scale and the ready disposal of by-products formed. Chlorine has hitherto generally been avoided as an oxidizing agent in organic synthesis, because of the inherent difficulty of handling a gas on a small scale in a laboratory. Moreover, the trained chemist would be inclined to expect that chlorine, as a highly reactive substance, would produce more by-products and result in a more difficulty resolvable mixture.

Bile acids containing more than one nuclear hydroxyl group can be oxidized either selectively or completely by regulating the amount of chlorine used or by protecting one or more of the hydroxyl groups against oxidation by esterification. For example, cholic acid, which has a hydroxyl group in each of the 3, 7 and 12 positions, can be oxidized selectively to 7 - keto - 3, 12 - dihydroxycholanic acid (an important intermediate in the preparation of desoxycholic acid) by using approximately one equivalent of chlorine; the 7-hydroxyl group is preferentially oxidized and the 3- and 12-hydroxyl groups are not affected until the 7-hydroxyl group is nearly completely oxidized. On the other hand, if cholic acid is treated with an excess (more than three equivalents) of chlorine, all three hydroxyl groups are oxidized giving dehydrocholic acid (3, 7, 12-triketo-cholanic acid), which is useful as a cholagogue. When the 3-hydroxyl group is esterified, as for example with succinic acid, and the resulting cholic acid 3-ester is treated with an excess of chlorine, the 7- and 12-hydroxyl groups are oxidized. Saponification of the product gives 3-hydroxy-7, 12-diketocholanic acid. This compound is useful as an intermediate for making lithocholic acid.

The oxidation process generally comprises treating an aqueous solution of an alkali metal salt of the hydroxylated bile acid with chlorine, acidifying the reaction mixture and isolating the resulting ketonic bile acid. For reasons of economy, it is preferred to use the sodium salt of the hydroxylated bile acid. This sodium salt is prepared by dissolving the free acid in an equivalent amount of dilute sodium hydroxide solution. In order to keep the solution weakly basic (pH about 7–8.5) during addition of the chlorine, and to prevent precipitation of the bile acid during the oxidation, a considerable excess of an alkali metal carbonate or bicarbonate, preferably sodium bicarbonate, is added to the solution. Approximately one and one-half equivalents of bicarbonate are used for every one of chlorine to be used. For convenient volumes of aqueous solution the saturation point of the bicarbonate will be exceeded, but undissolved bicarbonate can be kept suspended by means of stirring.

We have found that the yields are improved if a relatively small quantity of a water-soluble metallic bromide or iodide is added as a catalyst. The amount of bromide or iodide used is not critical; anywhere from about 1% to 50% or more by weight of the bile acid used is effective. Sodium bromide, used in the order of about 1–5% by weight is preferred as the most economical and the most effective catalyst.

When the metallic bromide catalyst is used, the reaction is rapid, and the chlorine may be passed into the reaction mixture as rapidly as desired without permitting escape of the gas. If the metallic bromide catalyst is not used, as in Example 1, the reaction is slower, and the addition of excess chlorine will give only selective oxidation unless a long period, on the order of several hours, of contact is allowed.

The oxidized bile acid is obtained from the oxidation mixture by precipitation with mineral acid, conveniently hydrochloric acid. If an exhaustive rather than a selective oxidation is desired, the same result can be obtained by continued addition of chlorine, which, in contrast with bromine, reacts with water to form acid. This is an additional advantage in the use of chlorine. The precipitated ketonic bile acid is then collected by filtration and purified by washing with water or a lower alkanol followed, if desired, by recrystallization from an appropriate solvent. A special method is used in the case of 7-keto-3,12-dihydroxycholanic acid. The crude oxidation product is dissolved in ethyl acetate and treated with diethylene glycol. This causes the diethylene glycol adduct of 7-keto-3,12-dihydroxycholanic acid to form, and it precipitates from solution in nearly pure form. This adduct and its formation constitute the subject matter of the co-pending application of B. F. Tullar, S. N. 115,770, filed September 14, 1949, now Patent No. 2,549,947.

The following examples will illustrate our invention more fully but should not be construed as limitative.

Example 1

Cholic acid (108 g.) was dissolved in 500 cc. of water containing 21 cc. of 35% sodium hydroxide. Sodium bicarbonate (72 g.) was added and excess chlorine gas was passed in at 20-25° C. over a period of one hour whereupon the acid started to precipitate. An additional 25 g. of sodium bicarbonate was then added, and the reaction mixture was stirred at 25-31° for two hours. The excess chlorine was then destroyed with sodium bisulfite, and the acid product was precipitated by addition of dilute hydrochloric acid. The suspension was extracted three times with ethyl acetate, the extracts were decolorized with charcoal and evaporated to dryness in vacuo. The residue was dissolved in 100 cc. of ethyl acetate and 20 cc. of diethylene glycol was added, and the solution was allowed to stand for two hours. The white crystals which had formed were collected by filtration, washed with ethyl acetate and air dried giving 35 g. of the diethylene glycol adduct of 7-keto-3,12-dihydroxycholanic acid, M. P. 140-145° C. A second crop of 5 g., M. P. 135-140° C., was obtained from the mother liquors after standing for an additional twenty-four hours.

Example 2

Cholic acid (440 g., 94% by assay) was dissolved in two liters of water containing 80 cc. of sodium hydroxide. Sodium bicarbonate (250 g.) and 10 g. of sodium bromide were added, the solution was cooled to 5° C., and with good stirring 95 g. of chlorine was passed in over a period of three hours. The reaction mixture was stirred for another three hours at 10-15° C., and was worked up by the method described in Example 1. The diethylene glycol-ethyl acetate solution kept at 0° C. for fifteen hours gave 286 g. of the diethylene glycol adduct of 7-keto-3,12-dihydroxycholanic acid, M. P. 144-147° C. (62% yield).

Example 3

Cholic acid (440 g., freed of ethanol and water by stirring with benzene and removal of the benzene in vacuo) was reacted with the same quantities of reagents as in Example 2 except that 85 g. of chlorine was used, and this was added over a period of one hour. The reaction mixture was kept at 0-5° C. during the chlorine addition and for fifteen hours thereafter. A first crop of 267 g. of the diethylene glycol adduct of 7-keto-3,12-dihydroxycholanic acid was obtained upon working up the reaction mixture as in Example 1. The mother liquor was warmed, decolorized with charcoal, concentrated to 600 cc. and cooled for about fifteen hours after recrystallization was initiated, and 20 g. of a second crop of the diethylene glycol adduct was obtained.

Example 4

Cholic acid (440 g.) containing 3% moisture, was freed of ethanol and water by mixing with benzene and evaporation of the benzene in vacuo. The residue was dissolved in two liters of water containing 80 cc. of 35% sodium hydroxide. Sodium bicarbonate (280 g.) was added and 85 g. of chlorine was passed in over a period of one and one-half hours. Some chloroform was added to control foaming, and the reaction mixture was stirred for four hours at about 10° C. and allowed to stand at room temperature for about fifteen hours. The reaction mixture was worked up by the ethyl acetate extraction and the diethylene glycol precipitation methods described in Example 1, giving 170 g. first crop and 41 g. second crop of the diethylene glycol adduct of 7-keto-3,12-dihydroxycholanic acid, M. P. 144-147° C. (47% yield).

Example 5

Sodium hydroxide (14.5 lbs. flake caustic) was dissolved in a stirred mixture of 400 lbs. of ice and 200 lbs. of water. Cholic acid (120 lbs., 19% ash, M. P. 197-198° C.) was then added and the mixture was stirred until all solid was dissolved. Sodium bicarbonate (70 lbs.) and 2.2 lbs. of sodium bromide were added, followed by sufficient additional sodium hydroxide to bring the pH to 8.5. Chlorine (24 lbs.) was passed in over a period of one and one-half hours; the pH dropped from 8.5 to 6.9. The reaction mixture was then stirred for five hours and allowed to stand for an additional fifteen hours. Ethyl acetate (200 lbs.) was then added and the pH brought to 2 by addition of hydrochloric acid. The ethyl acetate layer was separated and the aqueous phase was saturated with salt and reextracted with 200 lbs. of ethyl acetate. The combined ethyl acetate extracts were washed with 50 gal. of water saturated with salt, 8 lbs. of charcoal and 2 lbs. of filter aid were added and the mixture was warmed and filtered. The ethyl acetate filtrate was evaporated to dryness, the residue was dissolved in 110 lbs. of ethyl acetate, and 28.5 lbs. of diethylene glycol was added, whereupon crystals formed immediately. After cooling for about fifteen hours the precipitate was filtered and washed with ethyl acetate, giving 59 lbs. of the diethylene glycol adduct of 7-keto-3,12-dihydroxycholanic acid, M. P. 145-148° C.

Example 6

Cholic acid (108 g., 93% purity) was dissolved in 2 liters of water containing 13 g. of sodium hydroxide. Sodium bicarbonate (210 g.) and 45 g. of sodium iodide were then added, and chlorine was introduced at the rate of 60 g. per hour for seventy-five minutes, the temperature being maintained at 0-4° C. Stirring was continued for four hours after the addition of chlorine, and the pH of the mixture was 1.85. The solids in the reaction mixture were collected by filtration and washed several times with water, finally boiled in distilled water, filtered and dried. The crude solid, M. P. 184-192° C. was washed with isopropyl alcohol, giving 79 g., M. P. 220-225° C. Sixty grams of the latter mixture was recrystallized from isopropyl alcohol, giving 37 g. of 3,7,12-triketocholanic acid (dehydrocholic acid), M. P. 230-234° C. (corr.).

Example 7

A reaction similar to that described in Example 6 was performed using 108 g. of cholic acid, 13 g. of sodium hydroxide in 1.5 liters of water, 210 g. of sodium bicarbonate, and 30 g. of sodium bromide. After the addition of excess chlorine and allowing the reaction mixture to stand for about fifteen hours, the excess chlorine was removed by addition of sodium bisulfite, and the solid material was collected by filtration, washed with several volumes of water and dried. The yield was 62 g. of 3,7,12-triketocholanic acid, M. P. 223-228° C. (corr.).

Example 8

A solution of 108 g. of cholic acid in two liters of water containing 13 g. of sodium hydroxide, 210 g. of sodium bicarbonate and 30 g. of sodium bromide was cooled to 7° C., and chlorine was introduced at the rate of 150 g. per hour for eleven minutes. The temperature had risen to 11-12° C.

and chlorine was passed in at the same rate for ten more minutes with stirring. The solid material was collected and worked up as in Example 7 giving 75 g. of 3,7,12-triketocholanic acid, M. P. 216–228° C.

*Example 9*

A solution of 108 g. of cholic acid in two liters of water containing 13 g. of sodium hydroxide, 10 g. of sodium bromide and 200 g. of sodium bicarbonate was cooled to 5–10° C., and 70 g. of chlorine was introduced over a period of forty-five minutes, after which the reaction mixture was stirred for four hours. Excess chlorine was destroyed by addition of sodium bisulfite and the solution was filtered. The filtrate was acidified with hydrochloric acid to pH 2, and the resulting solids were collected by filtration. The solids were suspended in 1900 cc. of water and heated to 80° C. with stirring, filtered and rewashed with 1900 cc. of water, giving upon drying 85 g. of crude acid, M. P. 219–224.5° C. Fifty grams of the latter solid was refluxed with 150 cc. of 90% isopropyl alcohol, cooled, collected by filtration and washed with water. The resulting solid was dissolved in alkali, filtered, and the alkaline solution was heated to 80° C., and the acid was reprecipitated with hydrochloric acid, collected by filtration, boiled in water and again filtered and dried, giving 37 g. of 3,7,12-triketocholanic acid, M. P. 231–234° C.

We claim:

1. The process for oxidizing a nuclearly hydroxylated bile acid to a bile acid having at least one nuclear carbonyl group which comprises treating an aqueous solution containing an alkali metal salt of a member of the group consisting of cholic acid and cholic acid esterfied in the 3-position with chlorine in the presence of a member of the group consisting of a water-soluble metallic bromide and a water-soluble metallic iodide, while maintaining the reaction mixture weakly basic, acidifying the reaction mixture and isolating the resulting ketonic bile acid.

2. The process for oxidizing cholic acid to 7-keto-3,12-dihydroxycholanic acid, which comprises treating an aqueous solution containing sodium cholate with about one equivalent of chlorine in the presence of sodium bromide and an excess of sodium bicarbonate, acidifying the reaction mixture and isolating the resulting 7-keto-3,12-dihydroxycholanic acid.

3. The process of oxidizing cholic acid to 3,7,12-triketocholanic acid, which comprises treating an aqueous solution containing sodium cholate with an excess of chlorine in the presence of sodium bromide and an excess of sodium bicarbonate, acidifying the reaction mixture and isolating the resulting 3,7,12-triketocholanic acid.

RICHARD J. SERVIS.
RICHARD H. CARROLL.
BENJAMIN FRANKLIN TULLAR.

REFERENCES CITED

The following references are of record in the file of this patent:

UNITED STATES PATENTS

| Number | Name | Date |
|---|---|---|
| 2,244,328 | Charonnat | June 3, 1941 |

OTHER REFERENCES

Lassar-Cohn, Manual of Organic Chemistry 243 (1896).